(12) United States Patent
Wang et al.

(10) Patent No.: US 8,524,630 B2
(45) Date of Patent: Sep. 3, 2013

(54) MESOPOROUS ALUMINAS STABILIZED WITH RARE EARTH AND PHOSPHOROUS

(75) Inventors: Kun Wang, Bridgewater, NJ (US); Robert C. Lemon, Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 255 days.

(21) Appl. No.: 12/901,041

(22) Filed: Oct. 8, 2010

(65) Prior Publication Data
US 2012/0088654 A1   Apr. 12, 2012

(51) Int. Cl.
*B01J 27/18* (2006.01)
*B01J 23/10* (2006.01)
*B01J 21/04* (2006.01)

(52) U.S. Cl.
USPC ............. 502/208; 502/60; 502/214; 502/302; 502/303; 502/304; 502/355; 423/700; 423/701; 423/702; 423/703; 423/704; 423/705; 423/716

(58) Field of Classification Search
USPC .................. 502/60, 214, 208, 302, 303, 304, 502/355; 423/700, 701, 702, 703, 704, 705, 423/716
See application file for complete search history.

(56) References Cited

U.S. PATENT DOCUMENTS

| | | | |
|---|---|---|---|
| 5,057,296 A | | 10/1991 | Beck |
| 5,102,643 A | * | 4/1992 | Kresge et al. ................. 423/702 |
| 5,108,725 A | * | 4/1992 | Beck et al. .................... 423/705 |
| 5,198,203 A | | 3/1993 | Kresge et al. |
| 5,215,737 A | * | 6/1993 | Chu et al. ...................... 423/706 |
| 5,334,368 A | * | 8/1994 | Beck et al. .................... 423/704 |
| 5,863,515 A | | 1/1999 | Davis et al. |
| 6,027,706 A | | 2/2000 | Pinnavaia et al. |
| 6,214,312 B1 | | 4/2001 | Kolenda et al. |
| 6,284,696 B1 | * | 9/2001 | Koya et al. ...................... 502/64 |
| 6,447,741 B1 | | 9/2002 | Chester et al. |
| 6,797,155 B1 | * | 9/2004 | Chester et al. ................ 208/114 |
| 6,797,248 B2 | | 9/2004 | Liu et al. |
| 7,211,238 B2 | | 5/2007 | Shan et al. |
| 2005/0209092 A1 | * | 9/2005 | Sterte et al. ..................... 502/64 |
| 2005/0211603 A1 | * | 9/2005 | Guillaume et al. ........ 208/111.3 |
| 2005/0281734 A1 | | 12/2005 | Lee et al. |
| 2006/0096891 A1 | * | 5/2006 | Stamires et al. .............. 208/122 |

OTHER PUBLICATIONS

Zhang, W and Pinnavaia, T. J., "Rare earth stabilization of mesoporous alumina molecular sieves assembled through an NIII pathway", Chemical Communications (Cambridge) (1998), vol. 11, pp. 1185-1186, ISSN: 1359-7345.
Kresge, C.T. et al., "Ordered mesoporous molecular sieves synthesized by a liquid-crystal template mechanism", Nature 1992, 359, pp. 710-712.
Beck, J. S. et al., J. Am. Chem. Soc. 1992, 114, pp. 10834-10843.
Antonelli, D. M. et al., "Synthesis of Hexagonally Packed Mesoporous TiO, by a Modified Sol-Gel Method", Angew. Chem. Int. Ed. Eng. 1995, 34, No. 18, pp. 2014-2017.
Huo, Q. et al., Nature, "Generalized Synthesis of periodic surfactant/inorganic composite materials", 1994, 368, pp. 317-321.
Huo, Q. et al., Science 1995, 269, pp. 1242-1244.
Shan, Applied Catalysis A: General 254 (2003), pp. 339-343.

* cited by examiner

*Primary Examiner* — Elizabeth Wood
(74) *Attorney, Agent, or Firm* — David M. Weisberg (57) ABSTRACT

A mesoporous oxide composition includes, other than oxygen, a major amount of aluminum and lesser amounts of phosphorus and at least one rare earth element. The compositions have high surface area and excellent thermal and hydrothermal stability, with a relatively narrow pore size distribution in the mesoporous range. These compositions may be prepared by a hydrothermal co-precipitation method using an organic templating agent. These mesoporous oxide compositions may be used as catalysts or as supports for catalysts, for example, in a fluid catalytic cracking process.

13 Claims, 9 Drawing Sheets

MESOPOROUS ALUMINAS STABILIZED WITH RARE EARTH AND PHOSPHOROUS

FIELD OF THE INVENTION

This invention relates to a mesoporous oxide composition including, other than oxygen, a major amount of aluminum and lesser amounts of phosphorus and at least one rare earth element. The compositions have high surface area and excellent thermal and hydrothermal stability, with a relatively narrow pore size distribution in the mesoporous range.

Methods for making the compositions are also disclosed. These compositions may be used as catalysts or as supports for catalysts, for example, in a fluid catalytic cracking process.

BACKGROUND OF THE INVENTION

Mesoporous oxides having a variety of compositions and uniform pore sizes have been made with the use of organic templating or directing agents.

Silica-based mesoporous materials, e.g., M41S, have been prepared by organizing silica with organic surfactants (See C. T. Kresge et al., Nature 1992, 359, 710-712 and J. S. Beck et al., J. Am. Chem. Soc. 1992, 114, 10834-10843). These materials can exhibit cubic or hexagonal symmetry, e.g., MCM-48 and MCM-41, respectively. Thermal decomposition of the surfactant allows for the development of narrow pore size distributions in the range 15-100 Angstroms and BET specific surface areas above 1000 m$^2$/g.

Mesoporous materials are not restricted to silica. For example, MCM-41 type materials have been reported for oxides of titanium (See D. M. Antonelli et al., Angew. Chem. Int. Ed. Eng. 1995, 34, No. 18, 2014-2017), antimony, and lead (See Q. Huo et al., Nature 1994, 368, 317-321 and Q. Huo et al., Science 1995, 269, 1242-1244). Mesoporous crystalline materials containing such oxide materials as silica and alumina have been described (See, for example, U.S. Pat. No. 5,057,296 to J. S. Beck and U.S. Pat. No. 5,198,203 to C. T. Kresge et al.).

Mesoporous, alumina compositions having an average pore diameter substantially ranging from about 15 Angstroms to about 40 Angstroms and an average surface area of no less than about 500 m$^2$/g are described in the Davis et al U.S. Pat. No. 5,863,515. These materials can be formed by treating an aluminum source that is derived from an aluminum alkoxide in an organic-aqueous solution with an organic structured directing agent to form meso-sized micelles followed by recovery and calcination of the resulting solid composition. Organic structural directing agents include anionic surfactants, such as alkyl carboxylic acids.

Semi-crystalline alumina compositions with framework mesopores, characterized as the MSU-X series of materials, are described in the Pinnavia et al U.S. Pat. No. 6,027,706 and the Zhang et al article in Chem. Commun, 1998 1185. These materials are said to be semi-crystalline and exhibit an X-ray diffraction peak at less than 5 degrees 2×theta (CuKα). The compositions are made from inorganic aluminum precursors and nonionic surfactants, such as polyethylene oxide compositions. Recovery of the surfactant can be achieved through solvent extraction where the solvent may be water or ethanol. The surfactant occluded in the pores of the as-synthesized materials may also be removed by calcination.

The Liu et al U.S. Pat. No. 6,797,248 describes a mesoporous molecular sieve, MPL-1, and its preparation process. The anhydrous composition of this molecular sieve contains at least three elements, i.e. aluminum, phosphorus and oxygen. The molecular sieve has large pore diameters, generally in the 1.3 nm-10.0 nm, a large specific surface area and adsorption capacity. MPL-1 is synthesized under a hydrothermal process with an organic compound as template. Where necessary, silicon and/or titanium may be added to synthesize an aluminosilicophosphate, aluminotitanophosphate, or aluminosilicotitanophosphate molecular sieves having a mesoporous structure. Other metal compounds may also be added to synthesize derivatives of mesoporous aluminophosphate molecular sieves containing the corresponding hetero-atoms. The other metal element in addition to aluminum, which may be used in the molecular sieve may be one or more selected from the group consisting of La, Ce, Ti, Ni, Co, Cr, Ca, Cu, Zn, Mg, and Fe. The template used may be represented by the general formula: $R_1R_2R_3R_4NX$, wherein $R_1$, $R_2$, $R_3$, and $R_4$ independently represent a substituting group, N represents the element nitrogen or phosphorus, and X represents hydroxyl or halogen such as F, Cl, Br, or 1. At least one substituting group among $R_1$, $R_2$, $R_3$, and $R_4$ is a group containing 5 or more carbon atoms, such that $R_1R_2R_3R_4NX$ represents cetyl trimethylammonium chloride (CTMAC), cetyl trimethylammonium bromide (CTMAB), octadecyl trimethylammonium salts. At least one substituting group among $R_1$, $R_2$, $R_3$, and $R_4$ may contain one or more polar functional groups, which can be selected from a group consisting of amino, hydroxyl, carboxyl, sulfhydryl, aldehyde group, and halogens such as F, Cl, Br or 1. Examples of templating agents include phenethoxy-2-hydroxypropyl trimethylammonium chloride (PTMAC) and/or phenethoxy-2-hydroxypropyl trimethylammonium bromide (PTMAB).

The Kolenda et al U.S. Pat. No. 6,214,312 describes the preparation of oxides with a controlled porosity in which an alumina precursor is prepared by hydrolysis of at least one anionic inorganic source of aluminium in the presence of at least one surfactant. When the structuring agent is a quaternary ammonium type, the X ray diffraction pattern generally exhibits a single diffuse diffraction below 5 degrees 2×theta (CuKα). The structuring agent may be a cationic surfactant or a mixture of a cationic surfactant and an anionic surfactant, wherein the mixture has a net positive charge.

The Lee et al U.S. Patent Application Publication No. US 2005/0281734 A1 describes a mesoporous alumina molecular sieve made by mixing a surfactant and an alumina precursor with an organic solvent to produce a mixture, adding water to the mixture, hydrothermally synthesizing the mixture with added water, and then drying and calcinating the mixture to remove residual surfactants. Any of the surfactants, such as a quaternerary ammonium surfactant, commonly used in the field may be used. The alumina precursor may be an aluminum alkoxide, such as aluminum tri-sec-butoxide or aluminum isopropoxide.

The Shan et al U.S. Pat. No. 7,211,238 and the Shan et al article in Applied Catalysis A: General 254 (2003), pp. 339-343 describe mesoporous aluminum oxides with high surface areas, characterized as Al-TUD-1, which are synthesized using small organic templating agents instead of surfactants. Examples of such templating agents include tetraethylene glycol, triethanolamine, triisopropanolamine, triethylene glycol, diethylene glycol, sulfolane, and diethylglycoldibenzonate. The aluminum source for preparing the mesporous oxide may be mixed with a framework substituted element selected from the group consisting of Si, Ga, B, P, S, La, Ce, Ti, Fe, Ni, Mo, Co, Cr, Mg, Zn, Sn, V, W, Ru, Pt, Pd, In, Mn and Cu.

In the above-mentioned publications, regarding the manufacture of mesoporous oxides, precipitation of alumina (i.e. aluminum oxide) from a liquid media may occur. This precipitation may be influenced by the amphoteric properties of alumina. Alumina is generally insoluble in neutral aqueous media, but can be dissolved in a strong aqueous acid, such as sulfuric acid ($H_2SO_4$) or nitric acid ($HNO_3$), to form an acid aqueous solution of a salt, such as aluminum sulfate ($Al_2(SO_4)_3$) or aluminum nitrate ($Al(NO_3)_3$). Alumina can also be dissolved in a strong base, such as sodium hydroxide (NaOH), to form a basic aqueous solution of a salt, such as sodium aluminate ($Na_2Al_2O_4$ or $NaAlO_2$). Conversely, the dissolution process can be reversed, and alumina can be precipitated from an aqueous solution by the addition of (1) an appropriate base to an acidic solution of an aluminum salt or (2) an appropriate acid to a basic solution of an aluminum salt. Alumina can also be precipitated from an organic solution of an aluminum alkoxide by adding water to this solution, thereby causing the aluminum alkoxide to hydrolyze into a hydrated form of alumina and an alcohol. Precipitated alumina, before dehydration, may exist in the form of a gel or sol.

Alumina can exist in a hydrated form and a dehydrated form. An example of a fully hydrated form of alumina may be described as alumina trihydrate, i.e. $Al_2O_3 \cdot 3H_2O$, or aluminum hydroxide, i.e $Al(OH)_3$. Conventional forms of alumina may be prepared by precipitation from a liquid medium in the absence of a templating agent or structure directing agent to first form a hydrated form of alumina. This hydrated form of alumina may then be calcined under conditions to form various dehydrated forms of alumina. These dehydrated forms of alumina may be amorphous, semi-crystalline or crystalline. Activated alumina is a conventional and at least partially dehydrated form of alumina, which has been used in various catalytic operations as a stand-alone catalyst or catalyst support. Activated alumina includes the various transition aluminas, such as gamma-alumina, delta-alumina and theta-alumina.

Conventional forms of alumina, prepared by precipitation in the absence of a templating agent, followed by calcination at temperatures less than 1000° C., tend to have relatively high surface areas, for example, from 50 to 300 $m^2/g$. However, calcination at temperatures higher than 1000° C. may result in a significant reduction in surface area. For example, calcination of a transition alumina at temperatures higher than 1000° C. may result in the transformation of the transition alumina into alpha-alumina, which has a surface area of less than about 20 $m^2/g$.

The conventional forms of alumina which have relatively high surface areas, for example, from 50 to 300 $m^2/g$, also tend to have broad pore size distributions, often multi-modal, particularly in the 3-15 nm range. This broad pore size distribution has been reported to be disadvantageous. For example, in the above-mentioned Pinnavia et al U.S. Pat. No. 6,027,706, at column 1, lines 48-58, it is stated that wide pore distribution limits the effectiveness of catalysts, absorbents and ion-exchange systems, and that very broad pore distribution is particularly limiting in the use of aluminas in petroleum refining. Also, in the above-mentioned Lee et al U.S. Patent Application Publication No. US 2005/0281734 Al, in paragraph [0005], it is suggested that mesoporous alumina with uniform porosity, high surface area, chemical stability and thermal stability is becoming more valuable than existing alumina with non-uniform pore size distribution.

However, mesoporous alumina made with templating or structure directing agents tends to lack thermal and hydrothermal stability. Consequently, applications of such mesoporous alumina have been limited to relatively low temperatures. In order for these types of alumina to be applicable under harsh and demanding hydrothermal conditions, such as those encountered in fluid catalytic cracking (FCC), hydrothermal stability of these aluminas needs to be improved.

The Pinnavaia et al patent (U.S. Pat. No. 6,027,706) and the Zhang et al article (Chem. Commun., 1998, 1185), describing the MSU-X series of materials, report that a significant portion of surface area and porosity of these materials are lost when these materials are calcined at temperatures as high as 500° C. In the Zhang et al article (Chem. Commun., 1998, 1185) stabilization of MSU-X materials is reported when such alumina is doped with $Ce^{3+}$ or $La^{3+}$. However, only improvement in thermal stability is reported; there is no mention of the hydrothermal stability of these modified materials.

The Shan et al article (Applied Catalysis A: General 254 (2003), pp. 339-343) reports that materials, characterized as Al-TUD-1, have improved thermal stability vs. those of the MSU-X type of porous aluminas. However, it appears that no report of hydrothermal stability for these types of Al-TUD-1 materials is available.

The Chester et al U.S. Pat. No 6,447,741 describes a mesoporous aluminophosphate material, which includes a solid aluminophosphate composition modified with at least one element selected from zirconium, cerium, lanthanum, manganese, cobalt, zinc, and vanadium. Example 2 of the Chester et al patent (U.S. Pat. No. 6,447,741) describes a cerium modified aluminophosphate material, and Example 4 describes a lanthanum modified aluminophosphate material.

SUMMARY OF THE INVENTION

A mesoporous oxide composition comprises a mixed oxide composition comprising oxides of aluminum (Al), phosphorus (P) at least one rare earth element (RE) and, optionally, at least one addition element, other than oxygen (O), designated herein as M capable of being incorporated into the mesoporous oxide composition. The molar ratio of Al:P:RE:M may be 5-10:1:5-1:0-0.3. The mesoporous oxide composition may have an average pore diameter of 45 to 200 Angstroms. The mesoporous oxide composition may have a mono-modal pore size distribution.

The mesoporous oxide composition may, optionally, further comprise one or more additional elements (M) other than Al, P or RE. These elements are capable of being incorporated into the mesoporous composition. Examples of such additional elements include Si, Ga, B, S, Ti, Fe, Ni, Mo, Co, Cr, Mg, Zn, Sn, V, W, Ru, Pt, Pd, In, Mn, Cu, Ba, Ca and Zr.

RE may be a rare earth element, such as, for example, La, Ce, Nd, Y and Pr.

The mesoporous oxide composition may retain at least 40% of its surface area after being steamed at 760° C. fot 16 hours in 100% steam.

The mesoporous oxide may or may not exhibit an X-ray diffraction pattern with at least one peak at a position greater than 18 Angstrom units d-spacing with a relative intensity of 100.

The mesoporous oxide composition may have a specific surface area of at least 80 $m^2/g$. The mesoporous oxide composition may have a pore size distribution such that at least 65% of the pore volume has a pore diameter of 45 to 200 Angstroms, less than 20% of the pore volume has a pore diameter of less than 45 Angstroms and less than 15% of the pore volume has a pore diameter of greater than 200 Angstroms.

The mesoporous oxide composition may have a temperature programmed ammonia adsorption (TPAA) of at least 0.15 mmol/g.

The as-synthesized form of the mesoporous oxide composition may have a mesopore templating agent. The mesopore templating agent may be at least one cationic surfactant, at least one anionic surfactant or a combination thereof. The mesopore templating agent may further comprise at least one hydrocarbon having at least 5 carbon atoms. The mesopore templating agent may include at least one agent selected from the group consisting of tetraethylene glycol, triethanolamine, triisopropylamine, triethylene glycol, diethylene glycol, sulfolane and diethylglycoldibenzonate.

The mesopore templating agent may be a cationic surfactant of the formula:

wherein Q is nitrogen or phosphorus and wherein at least one of $R_1$, $R_2$, $R_3$ and $R_4$ is aryl or alkyl of from 6 to about 36 carbon atoms, the remainder of $R_1$, $R_2$, $R_3$ and $R_4$ being selected from the group consisting of hydrogen, alkyl of from 1 to 5 carbon atoms and combinations thereof.

The mesoporous oxide composition may be in a calcined form, wherein it has been calcined under conditions sufficient to remove residual mesopore templating agent from the as-synthesized form of said mesoporous oxide composition to form a calcined form of said mesoporous oxide composition. The calcined form of the mesoporous oxide composition may have an average pore size of from 45 Angstroms to 80 Angstroms, and a surface area of 150 to 300 $m^2/g$.

The calcined form of the mesoporous composition may be steamed under conditions sufficient to form a steamed form of said mesoporous oxide composition, wherein the steamed form of said mesoporous oxide composition has an average pore size of at least 100 Angstroms, and a surface area of at least 90 $m^2/g$.

The mesoporous oxide composition described herein may be made by a method comprising the steps of:
(a) forming a reaction mixture comprising a source of at least one rare earth element, a source of aluminum, a source of phosphorus, and a mesopore templating agent in a liquid medium;
(b) maintaining the reaction mixture of step (a) under conditions sufficient to precipitate the sources of rare earth element, aluminum, phosphorus and the mesopore templating agent to form an as-synthesized form of said mesoporous oxide composition comprising residual mesoporous templating agent within pores of said mesopore oxide composition;
(c) separating the liquid from the as-synthesized form of the mesoporous oxide composition obtained in step (b);
(d) optionally, removing at least a portion the mesopore templating agent from the as-synthesized form of the mesoporous oxide composition of step (c) by solvent extraction; and
(e) calcining the as-synthesized form of said mesoporous oxide composition of step (c) or step (d) under calcination conditions to form a calcined form of the mesoporous oxide composition, wherein the calcination conditions are sufficient to remove any residual mesopore templating agent and to cause condensation reactions with hydroxyl groups to liberate $H_2O$.

The molar ratio of Al:P:RE in the reaction mixture of step (a) may be 5-10:1:0.5-1. The calcined form of the mesoporous composition of step (e) may have an average pore size of from 45 Angstroms to 80 Angstroms, and a surface area of 150 to 300 $m^2/g$.

The source of aluminum may be selected from the group consisting of a basic aluminum salt, an acidic aluminum salt, an alumina gel or sol and an aluminum alkoxide. The source of phosphorus may be selected from the group consisting of phosphoric acid and ammonium phosphate. The source of rare earth element may be nitrate or sulfate salt of at least one rare earth element selected from the group consisting of La, Ce, Nd, Y and Pr.

The templating agent or structure directing agent described herein is referred to as a mesopore templating agent. This mesopore templating agent may comprise at least one cationic surfactant, anionic surfactant or non-ionic surfactant or a combination thereof.

The mesopore templating agent may be a non-surfactant molecule, such as tetraethylene glycol, triethanolamine, triisopropylamine, triethylene glycol, diethylene glycol, sulfolane and diethylglycoldibenzonate.

The mesopore templating agent may be a cationic surfactant of the formula:

wherein Q is nitrogen or phosphorus and wherein at least one of $R_1$, $R_2$, $R_3$ and $R_4$ is aryl or alkyl of from 6 to about 36 carbon atoms, the remainder of $R_1$, $R_2$, $R_3$ and $R_4$ being selected from the group consisting of hydrogen, alkyl of from 1 to 5 carbon atoms and combinations thereof.

DETAILED DESCRIPTION OF THE INVENTION

A mesoporous oxide composition comprises a mixed oxide composition comprising oxides of aluminum (Al), phosphorus (P) and at least one rare earth element (RE). On a molar or atomic equivalent basis, the mixed oxide comprises more Al than P or RE. As such, the mixed oxide may retain many of the properties of alumina, for example, in terms of acidity. In contrast, aluminophosphates, with an equal number of moles or atomic equivalents of Al and P, tend to lack acidity.

The mesoporous oxide composition may, optionally, further comprise one or more additional elements (M) other than oxygen (O), Al, P or RE. These elements are capable of being incorporated into the mesoporous composition. Examples of such additional elements include Si, Ga, B, S, Ti, Fe, Ni, Mo, Co, Cr, Mg, Zn, Sn, V, W, Ru, Pt, Pd, In, Mn, Cu, Ba, Ca and Zr. The molar ratio of Al:P:RE:M may be 5-10:1:0.5-1:0-0.3.

Mesoporous oxides are known in the art as having pores in the range of 20 to 300 nm. The mesoporous oxides described herein have a mono-modal pores size distribution. Certain mesoporous oxides described herein may exhibit an observable X-ray diffraction pattern (CuKα) with at least one peak at a position greater than 18 Angstrom units d-spacing with a relative intensity of 100. This X-ray diffraction pattern is similar to that observed for M41S type materials. This X-ray diffraction pattern is believed to result from the use of a mesopore templating agent, such as a surfactant, during the synthesis of the mesoporous oxide to create an ordered, uniform distribution of mesopores within the precipitated oxides.

The mesoporous oxide composition produced herein may have a mono-modal pore size distribution. This mesoporous oxide composition may have a specific surface area of at least 80 m²/g and an average pore diameter of 45 to 200 Angstroms. The pore size distribution may be such that at least 65%, for example, at least 75% of the pore volume has a pore diameter of 45 to 200 Angstroms, less than 20%, for example, less than 15% of the pore volume has a pore diameter of less than 45 Angstroms and less than 15%, for example, less than 10% of the pore volume has a pore diameter of greater than 200 Angstroms. Mono-modal pore size distributions of this type are shown in FIGS. 1B, 2B, 3B, 4B and 5B. This mesoporous oxide composition may retain at least 40% of its surface area after being steamed at 760° C. for 16 hours in 100% steam.

The acidity of the mesoporous oxide composition described herein may be measured by temperature programmed ammonia adsorption (TPAA) by procedures described below. In particular, this composition may have a TPAA of at least 0.15 mmol/g, especially after the composition is ammonium exchanged to remove any residual alkali metal ions, e.g., sodium ions, as described below.

Temperature programmed ammonia adsorption (TPAA) is conducted using a Mettler TGA/SDTA 851 thermogravimetric analysis system at ambient pressure. The mesoporous alumina is calcined in flowing air to about 500° C. for about three hours; at least until a constant sample weight is obtained. The temperature of the sample is then reduced in flowing helium to 250° C. and allowed to equilibrate at this temperature in flowing helium and weighed. Chemi-sorption of ammonia is measured at 250° C. After being weighed, the sample is subjected to a number of pulses (about 12 seconds/pulse) of gaseous mixture containing helium and ammonia (10%) until a constant weight is obtained. After each pulse of the gas mixture, the sample is flushed with flowing helium for about 3 minutes. About 20 separate pulses of the gas mixture are used in each test. The increase in weight of the sample in terms of mg/g based on the sample weight after calcination is used to determine the moles of $NH_3$ adsorbed per gram of sample.

The mesoporous oxide composition described herein may be made by a method comprising the steps of:
(a) forming a reaction mixture comprising a source of at least one rare earth element, a source of aluminum, a source of phosphorus, and a mesopore templating agent in a liquid medium;
(b) maintaining the reaction mixture of step (a) under conditions sufficient to precipitate the sources of rare earth element, aluminum, phosphorus and the mesopore templating agent to form an as-synthesized form of said mesoporous oxide composition comprising residual mesoporous templating agent within pores of said mesopore oxide composition;
(c) separating the liquid from the as-synthesized form of the mesoporous oxide composition obtained in step (b);
(d) optionally, removing at least a portion the mesopore templating agent from the as-synthesized form of the mesoporous oxide composition of step (c) by solvent extraction; and
(e) calcining the as-synthesized form of said mesoporous oxide composition of step (c) or step (d) under calcination conditions to form a calcined form of the mesoporous oxide composition, wherein the calcination conditions are sufficient to remove any residual mesopore templating agent and to cause condensation reactions with hydroxyl groups to liberate $H_2O$.

The molar ratio of Al:P:RE in the reaction mixture of step (a) may be 5-10:1:0.5-1. The calcined form of the mesoporous composition of step (e) may have an average pore size of from 45 Angstroms to 80 Angstroms, and a surface area of 150 to 300 m²/g.

The templating agent or structure directing agent described herein is referred to as a mesopore templating agent. This mesopore templating agent may comprise at least one cationic surfactant, anionic surfactant or non-ionic surfactant or a combination thereof. Examples of cationic surfactants are described in the Kresge et al U.S. Pat. No. 5,198,203, the Liu et al U.S. Pat. No. 6,797,248 and the Kolenda et al U.S. Pat. No. 6,214,312. Examples of anionic surfactants are described in the Davis et al U.S. Pat. No. 5,863,515. Examples of non-ionic surfactants are described in the the Pinnavia et al U.S. Pat. No. 6,027,706. These surfactants may form a uniform pattern of elongated or tubular micelles (e.g., a liquid crystal array) in the reaction mixture used to form the mesoporous oxide composition. When the sources of oxides in the reaction mixture are precipitated, the precipitated oxides may surround spaces occupied by the micelles. Optionally, the surfactant in the reaction mixture may be combined with an organic species which is soluble within the lipophilic regions of the micelles. Such organic species may swell or thicken the micelles. Examples of such organic species include hydrocarbons with at least 5 carbon atoms, such as hexane.

Non-surfactant molecules may also be used as the mesopore templating agent. Examples of such non-surfactant mesopore templating agents are described in the Shan et al U.S. Pat. No. 7,211,238. Particular examples of such mesopore templating agents include tetraethylene glycol, triethanolamine, triisopropylamine, triethylene glycol, diethylene glycol, sulfolane and diethylglycoldibenzonate.

A preferred mesopore templating agent is a cationic surfactant as described in the Kresge et al U.S. Pat. No. 5,198,203 of the formula:

wherein Q is nitrogen or phosphorus and wherein at least one of $R_1$, $R_2$, $R_3$ and $R_4$ is aryl or alkyl of from 6 to about 36 carbon atoms, the remainder of $R_1$, $R_2$, $R_3$ and $R_4$ being selected from the group consisting of hydrogen, alkyl of from 1 to 5 carbon atoms and combinations thereof.

Examples of sources of aluminum, which may be used in the reaction mixture, include an aqueous solution of an acidic aluminum salt, such as aluminum nitrate ($Al(NO_3)_3$), aluminum sulfate ($Al_2(SO_4)_3$) or potassium aluminum sulfate $KAl(SO_4)_2$, and an aqueous solution of a basic aluminum salt, such as sodium aluminate. The Na to Al atomic ratio of the sodium aluminate in the aqueous solution may be 0.9-1.1. Other examples of sources of aluminum include aqueous dispersions, such as sols or gels, of very small alumina particles. These sols or gels may be stabilized within the reaction mixture prior to precipitation with a peptizing agent, such as HCl. Polycations of aluminum, such as aluminum chlorohydrate, comprising $Al_{13}O_4(OH)_{24}^{7+}$ and chloride anions, may be used as an aluminum source. Further examples of sources of aluminum include organoaluminum compounds with hydrolyzable organic groups. Particular examples of such organoaluminum compounds include aluminum alkoxides, especially those having from 2 to 6 carbon atoms per alkoxide group. Examples of such aluminum alkoxides include, aluminum ethoxide, aluminum butoxide (e.g., aluminum tri-sec-butoxide) and aluminum isopropoxide.

Examples of sources of phosphorus, which may be used in the reaction mixture, include phosphoric acid ($H_3PO_4$), mono-basic phosphate salts, di-basic phosphate salts, and tri-basic phosphate salts, such as ammonium phosphate and sodium phosphate.

For the purposes of this disclosure, yttrium (Y) is considered to be a rare earth element. Sources of RE include sources of Y and sources of elements with atomic numbers 57-71, i.e. La, Ce, Pr, Nd, Pm, Sm, Eu, Gd, Tb, Dy, Ho, Er, Tm, Yb and Lu. Particular examples of rare earth elements include La, Ce, Nd, Y and Pr. Particular sources of RE include rare earth salts, particularly halide (e.g., chloride), nitrate or sulfate salts, especially trinitrate salts, such as $La(NO_3)_3$, $Ce(NO_3)_3$, $Nd(NO_3)_3$, $Y(NO_3)_3$ and $Pr(NO_3)_3$.

After the reaction mixture is formed, it is maintained under sufficient conditions to precipitate the oxide composition along with occluded templating agent. These conditions may include adding a base to precipitate acid salts or adding an acid to precipitate basic salts. These conditions may also include adding water to hydrolyze aluminum alkoxides. These conditions are maintained for a sufficient time for adequate precipitation, for example, from 2 to 168 hours. The temperature of the reaction mixture may be maintained or adjusted to a sufficient precipitation temperature, for example, from room temperature (e.g., 20° C.) to 150° C.

The precipitate may be separated from liquid remaining in the reaction mixture by an appropriate technique or techniques, for example, by decantation, washing, e.g., with deionized water, filtration and drying. Drying may take place under sufficient drying conditions, such as in air or an inert atmosphere, e.g., in nitrogen, at a sufficient temperature, for example, from 80° C. to 150° C., for a sufficient time, for example, from 2 hours to 50 hours.

When the mesopore templating agent is capable of being removed by solvent extraction, for example, when the templating agent is a non-ionic surfactant, such solvent extraction may take place. Whether or not solvent extraction is used, the precipitated oxide is calcined under sufficient conditions (1) to remove any or all remaining residual mesopore templating agent and (2) to polymerize the oxide by inducing condensation reactions between hydroxyl groups to link RE, Al and P atoms via covalent bonds through oxygen atoms. For example, two Al—OH groups may react to form Al—O—Al plus $H_2O$. The calcination conditions may include heating the oxide material for a sufficient time, for example, from 2 to 12 hours, at a sufficient temperature, for example, from 400° C. to 600° C., in a sufficient atmosphere, for example, in air.

If the oxide composition includes unwanted cations, such as $Na^+$, these cations may be exchanged with ammonium cations followed by calcination. For example, the sodium form of the oxide composition may be contacted with an aqueous solution of ammonia or an ammonium salt, such as a 1 N $NH_4NO_3$, to form the ammonium form of the oxide composition. The ammonium form of the oxide composition may then be calcined under sufficient conditions (1) to liberate $NH_3$ and (2) to convert the ammonium form of the oxide composition into the acid form (also known as the hydrogen form) of the oxide composition. These calcination conditions may comprise heating the ammonium form of the oxide material for a sufficient time, for example, from 2 to 12 hours, at a sufficient temperature, for example, from 400° C. to 600° C., in a sufficient atmosphere, for example, in air.

It has been discovered that, when calcined forms of mesporous oxide compositions described herein are steamed, the pore size of these compositions may expand, while at least 40% of the surface area is maintained. For example, the steamed form of the calcined form of the mesoporous oxide composition may have an average pore size of at least 100 Angstroms, and a surface area of at least 90 $m^2/g$. Sufficient steaming conditions for expanding the pore size of the mesoporous oxide compositions may include, for example, the use of 100% steam, a steaming temperature of from 600° C. to 800° C. and a steaming time of from 1 to 24 hours.

The mesoporous oxide materials according to the invention may be used in cracking catalysts for catalytic cracking processes, preferably as a support in combination with other cracking catalyst materials, such as zeolites (e.g., USY zeolites), and activated matrix. Other conventional cracking catalyst materials, such as binding agents, clays, alumina, silica-alumina, and the like, can also be included as part of the cracking catalyst.

As is well known in the art, catalytic cracking processes convert feedstock hydrocarbon compounds to product hydrocarbon compounds of lower molecular weight than the feedstock hydrocarbon compounds. In particular, the mesoporous oxide materials according to the present invention may be used in catalytic processes operating at temperatures from about 200° C. to about 870° C. and under reduced, atmospheric or superatmospheric pressure. The catalytic process may take place in a fixed bed, moving bed or fluidized bed, and the hydrocarbon flow may be either concurrent or countercurrent to the catalyst flow. The mesoporous oxide materials of the invention are useful in the Fluid Catalytic Cracking (FCC) and Thermofor Catalytic Cracking (TCC) processes.

The TCC process is a moving bed process, and the catalyst is in the shape of pellets or beads having an average particle size of about one-sixty-fourth to one-fourth inch. Active, hot catalyst beads progress downwardly concurrent with a hydrocarbon charge stock through a cracking reaction zone. The hydrocarbon products are separated from the coked catalyst and recovered, and the catalyst is recovered at the lower end of the zone and regenerated. TCC conversion conditions may include an average reactor temperature of about 450° C. to about 510° C.; catalyst/oil volume ratio of about 2 to about 7; reactor space velocity of about 1 to about 2.5 vol./hr./vol.; and recycle to fresh feed ratio of 0 to about 0.5 (volume).

The mesoporous oxide materials of the invention are particularly useful in fluid catalytic cracking (FCC), in which the cracking catalyst is typically in the form of fine particles with a particle size of about 10 to 200 microns. The particles are generally suspended in the feed and propelled upward in a reaction zone. A relatively heavy hydrocarbon feedstock, e.g., a gas oil, is admixed with the cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

FCC conversion conditions may include a riser top temperature of about 500° C. to about 595° C., preferably from about 520° C. to about 565° C., and most preferably from about 530° C. to about 550° C.; catalyst/oil weight ratio of about 3 to about 12, preferably about 4 to about 11, and most preferably about 5 to about 10; and catalyst residence time of about 0.5 to about 15 seconds, preferably about 1 to about 10 seconds.

The hydrocarbon feedstock to be cracked may include, in whole or in part, a gas oil (e.g., light, medium, or heavy gas oil) having an initial boiling point above 204° C., a 50% point of at least 260° C. and an end point of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed for convenience in terms of the boiling point corrected to atmospheric pressure. Resids or deeper cut gas oils with high metals contents can also be cracked using catalysts employing the mesoporous oxide materials of the invention.

EXAMPLE 1

Preparation of Mesoporous Alumina Modified with Lanthanum and Phosphorous

In a plastic beaker, 27 g of 85% $H_3PO_4$ was slowly added to 300 g of DI water with stirring. 101.4 g of $La(NO_3)_3 \cdot 6H_2O$ and 45 g of concentrated (96%) $H_2SO_4$ were then added with stirring (mixture A). In a separate plastic beaker, 153.6 g of $NaAlO_2$ (EMD chemicals) and 180 g of MTAB were dissolved in 960 g of DI water (mixture B). Mixture A was then slowly added to mixture B with vigorous stirring. The pH of the combined mixture is 11.0. An amount of 22.6 g of concentrated (96%) $H_2SO_4$ was then added to bring the pH to 9.0. The combined mixture was then placed in a steam box (98° C.) and held for 48 hr. The solid was filtered, washed with DI water, and dried in an oven at 110° C. overnight. This as-synthesized, solid material is labeled herein as EX 1 AS.

Figure 1A:
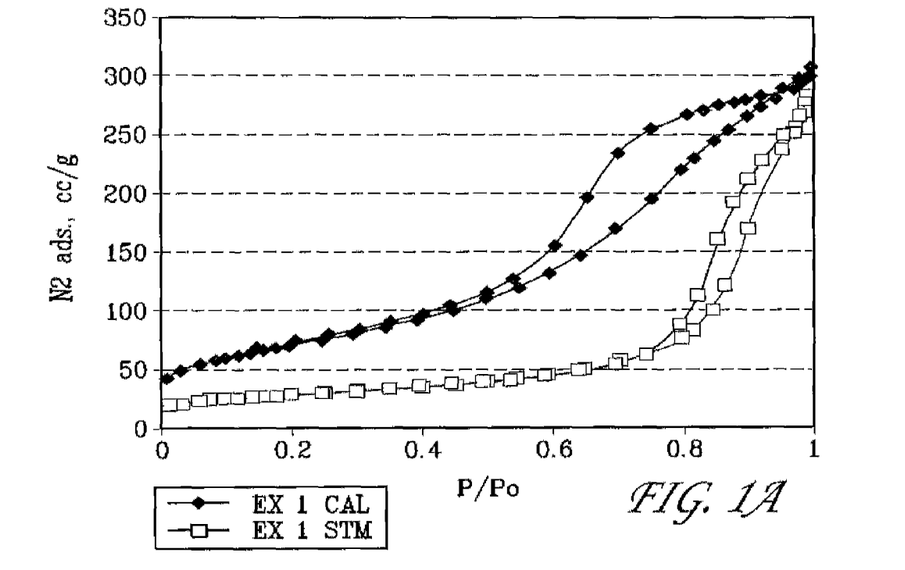
FIG. 1A is a graph plotting $N_2$ adsorption isotherms for La/P stabilized alumina as described in Example 1.
Figure 1B:
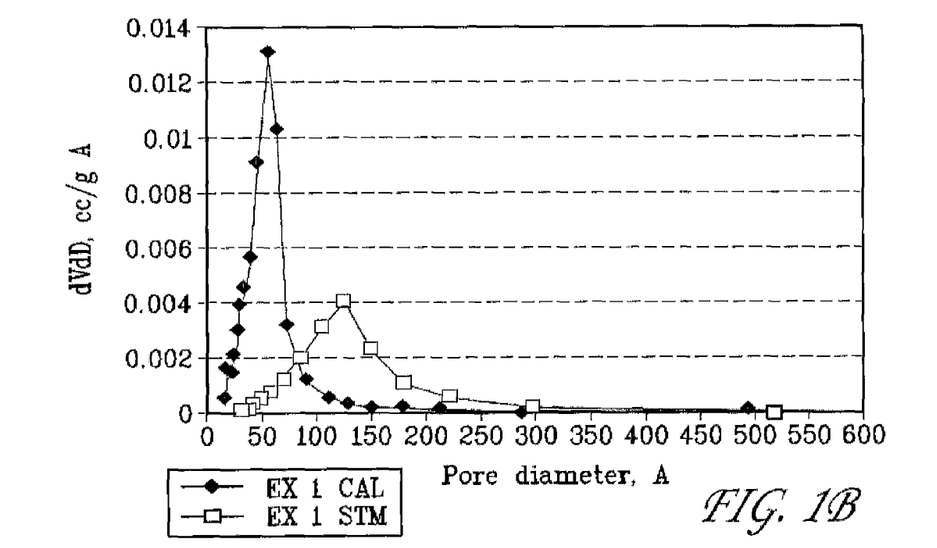
FIG. 1B is a graph plotting pore size distribution (PSD) measured by $N_2$ physi-sorption for a La/P stabilized mesoporous alumina as described in Example 1.

The surfactant was removed by calcination in air at 500° C. for 4 hr; and the $Na^+$ in the calcined material was removed by exchanging with 1 N $NH_4NO_3$ solution. The material was calcined again at 500° C. for 3 hr after the exchange and is labeled herein as EX 1 CAL. The exchanged and calcined material was then steamed at 760° C. for 16 hr in 100% steam. This steamed material is labeled herein as EX 1 STM. $N_2$ adsorption-desorption isotherms and pore size distribution (PSD) are shown in FIGS. 1A and 1B, respectively. The molar ratio of Al:P:RE was 8.47:1:0.76 for these materials, e.g., in the as-synthesized form (EX 1 AS), the calcined and exchanged form (EX 1 CAL) and the steamed form (EX 1 STM). Properties of these materials are shown in Table 1.

EXAMPLE 2

Preparation of Mesoporous Alumina Modified with Cerium and Phosphorous

In a plastic beaker, 27 g of 85% $H_3PO_4$ was slowly added to 300 g of DI water with stirring. 101.6 g of $Ce(NO_3)_3 \cdot 6H_2O$ and 45 g of concentrated (96%) $H_2SO_4$ were then added with stirring (mixture A). In a separate plastic beaker, 153.6 g of $NaAlO_2$ (EMD chemicals) and 180 g of MTAB were dissolved in 960 g of DI water (mixture B). Mixture A was then slowly added to mixture B with vigorous stirring. The pH of the combined mixture is 11.1. An amount of 22.9 g of concentrated (96%) $H_2SO_4$ was then added to bring the pH is 9.0. The combined mixture was then placed in a steam box (98° C.) and held for 48 hr. The solid was filtered, washed with DI water, and dried in an oven at 110° C. overnight. This as-synthesized, solid material is labeled herein as EX 2 AS.

Figure 2A:
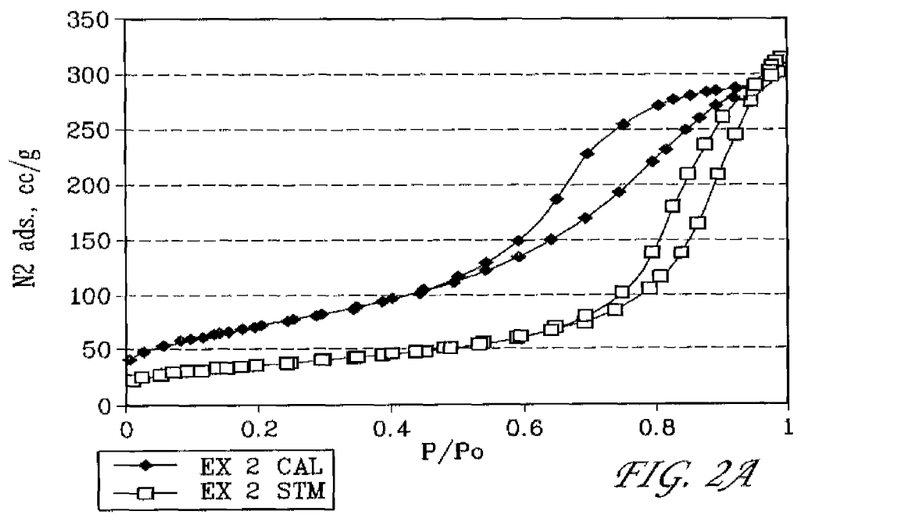
FIG. 2A is a graph plotting $N_2$ adsorption isotherms for Ce/P stabilized alumina as described in Example 2.
Figure 2B:
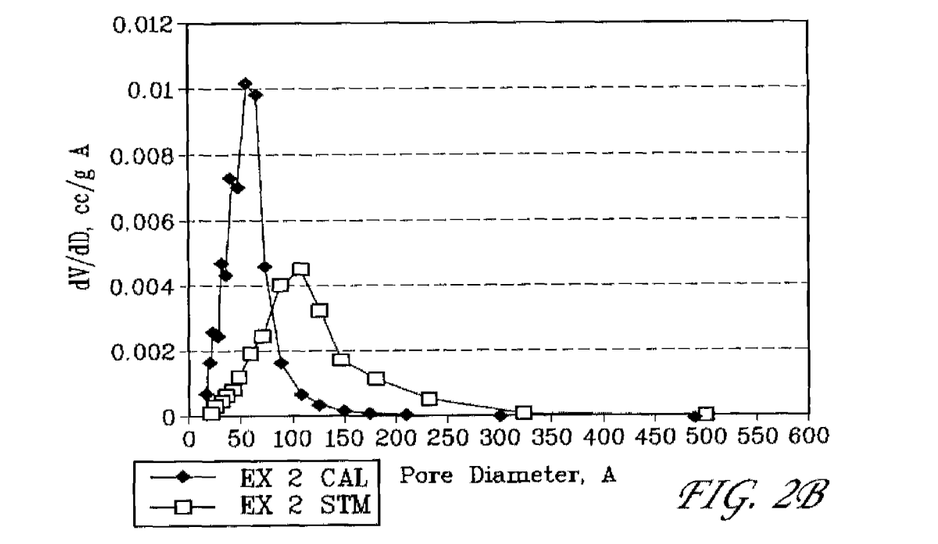
FIG. 2B is a graph plotting pore size distribution (PSD) measured by $N_2$ physi-sorption for a Ce/P stabilized mesoporous alumina as described in Example 2.

The surfactant was removed by calcination in air at 500° C. for 4 hr; and the $Na^+$ in the calcined material was removed by exchanging with 1 N $NH_4NO_3$ solution. The material was calcined again at 500° C. for 3 hr after the exchange. This material is labeled herein as EX 2 CAL. The exchanged and calcined material was then steamed at 760° C. for 16 hr in 100% steam, and is labeled herein as EX 2 STM. $N_2$ adsorption-desorption isotherms and pore size distribution (PSD) are shown in FIGS. 2A and 2B, respectively. The molar ratio of Al:P:RE was 6.06:1:0.72 for these materials, e.g., in the as-synthesized form (EX 2 AS), the calcined and exchanged form (EX 2 CAL) and the steamed form (EX 2 STM). Properties of these materials are shown in Table 1.

EXAMPLE 3

Preparation of Mesoporous Alumina Modified with Neodymium and Phosphorous

In a plastic beaker, 27 g of 85% $H_3PO_4$ was slowly added to 300 g of DI water with stirring. 102.6 g of $Nd(NO_3)_3 \cdot 6H_2O$ and 45 g of concentrated (96%) $H_2SO_4$ were then added with stirring (mixture A). In a separate plastic beaker, 153.6 g of $NaAlO_2$ (EMD chemicals) and 180 g of MTAB were dissolved in 960 g of DI water (mixture B). Mixture A was then slowly added to mixture B with vigorous stirring. The pH of the combined mixture is 11.36. An amount of 17.3 g of concentrated (96%) $H_2SO_4$ was then added to bring the pH to 9.0. The combined mixture was then placed in a steam box (98° C.) and held for 48 hr. The solid was filtered, washed with DI water, and dried in an oven at 110° C. overnight. The as-synthesized, solid material is labeled herein as EX 3 AS.

Figure 3A:
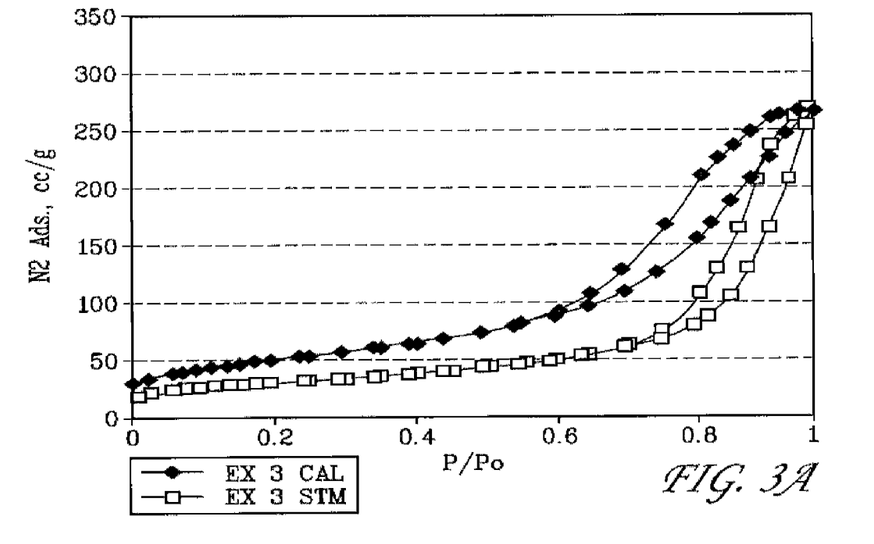
FIG. 3A is a graph plotting $N_2$ adsorption isotherms for Nd/P stabilized alumina as described in Example 3.
Figure 3B:
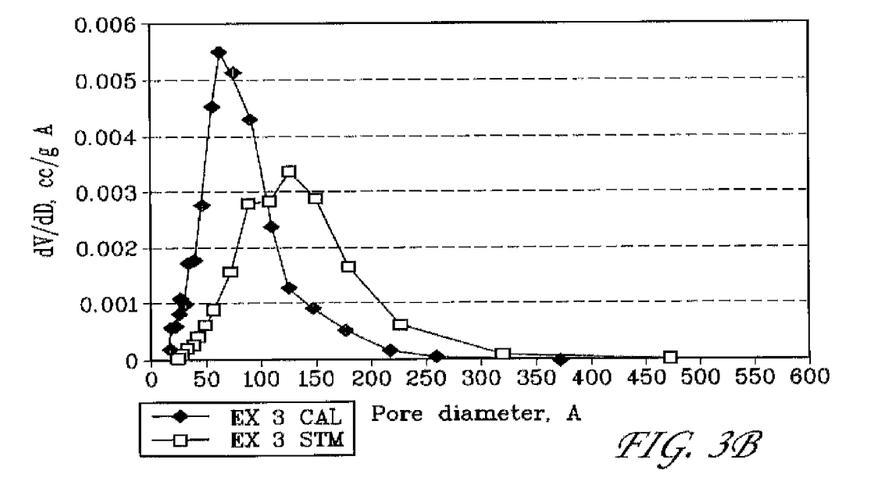
FIG. 3B is a graph plotting pore size distribution (PSD) measured by $N_2$ physi-sorption for a Nd/P stabilized mesoporous alumina as described in Example 3.

The surfactant was removed by calcination in air at 500° C. for 4 hr; and the $Na^+$ in the calcined material was moved by exchanging with 1 N $NH_4NO_3$ solution. The material was calcined again at 500° C. for 3 hr after the exchange. This material is labeled herein as EX 3 CAL. The exchanged and calcined material was then steamed at 760° C. for 16 hr in 100% steam and is labeled herein as EX 3 STM. $N_2$ adsorption-desorption isotherms and pore size distribution (PSD) are shown in FIGS. 3A and 3B, respectively. The molar ratio of Al:P:RE was 6.12:1:0.84 for these materials, e.g., in the as-synthesized form (EX 3 AS), the calcined and exchanged form (EX 3 CAL) and the steamed form (EX 3 STM). Properties of these materials are shown in Table 1.

EXAMPLE 4

Preparation of Mesoporous Alumina Modified with Yttrium and Phosphorous

Figure 4A:
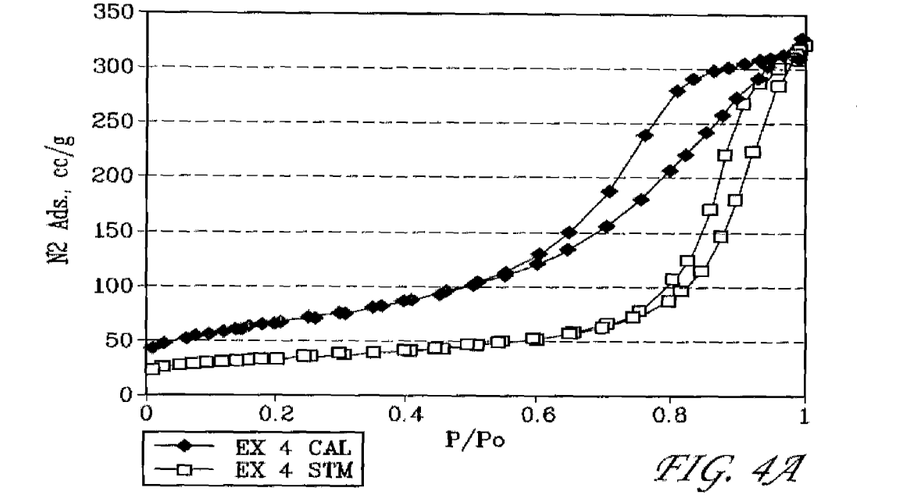
FIG. 4A is a graph plotting $N_2$ adsorption isotherms for Y/P stabilized mesoporous alumina as described in Example 4.
Figure 4B:
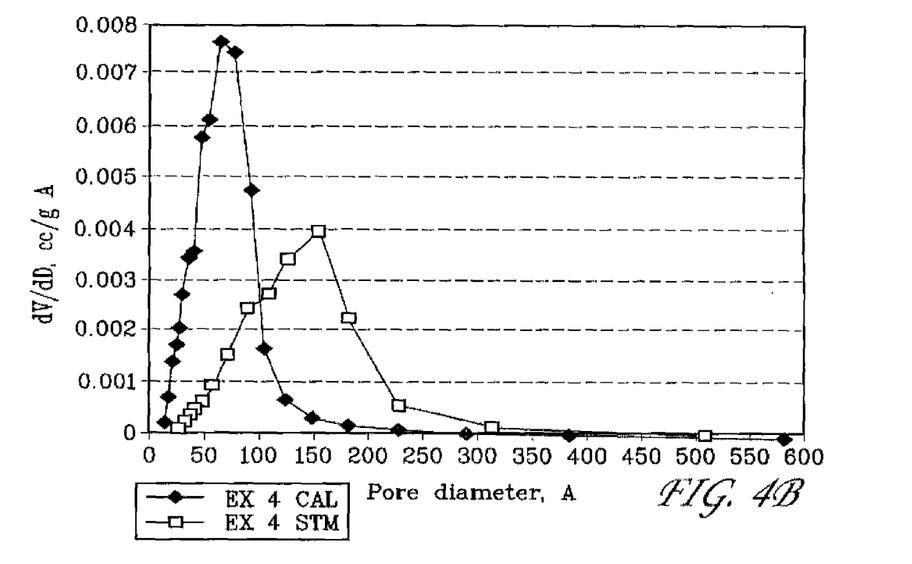
FIG. 4B is a graph plotting pore size distribution (PSD) measured by $N_2$ physi-sorption for Y/P stabilized alumina as described in Example 4.
Figure 4C:
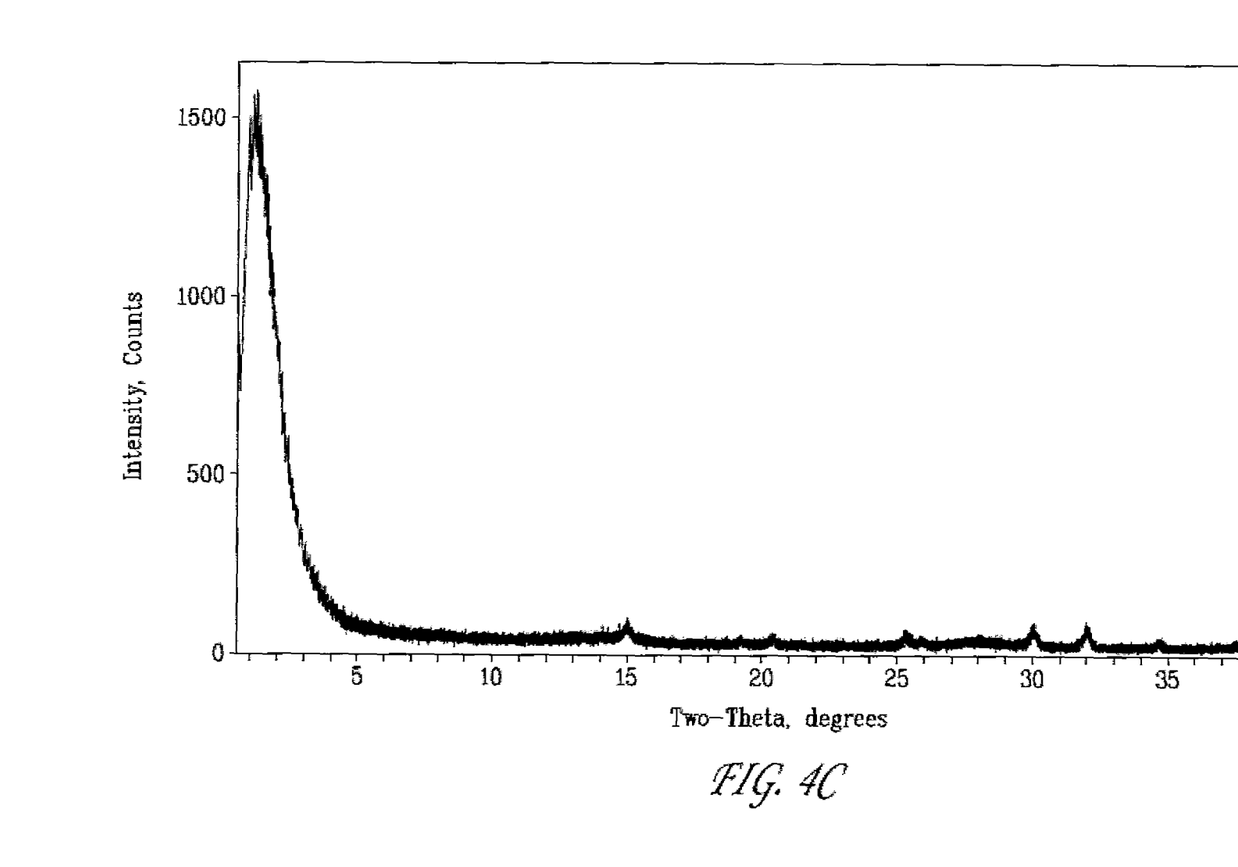
FIG. 4C is an X-ray diffraction (XRD) pattern for an as-synthesized form of a Y/P stabilized mesoporous alumina as described in Example 4.

In a plastic beaker, 27 g of 85% $H_3PO_4$ was slowly added to 300 g of DI water with stirring. 81.3 g of $Y(NO_3)_3 \cdot 4H_2O$ and 45 g of concentrated (96%) $H_2SO_4$ were then added with stirring (mixture A). In a separate plastic beaker, 153.6 g of $NaAlO_2$ (EMD chemicals) and 180 g of MTAB were dissolved in 960 g of DI water (mixture B). Mixture A was then slowly added to mixture B with vigorous stirring. The pH of the combined mixture is 10.9. An amount of 19.0 g of concentrated (96%) $H_2SO_4$ was then added to bring the pH to 9.0. The combined mixture was then placed in a steam box (98° C.) and held for 48 hr. The solid was filtered, washed with DI water, and dried in an oven at 110° C. overnight. This as-synthesized, solid material is labeled herein as EX 4 AS. An X-ray diffraction (XRD) pattern for this material is shown in FIG. 4C.

The surfactant was removed by calcination in air at 500° C. for 4 hr; and the $Na^+$ in the calcined material was removed by exchanging with 1 N $NH_4NO_3$ solution. The material was calcined again at 500° C. for 3 hr after the exchange and is labeled herein as EX 4 CAL. The exchanged and calcined material was then steamed at 760° C. for 16 hr in 100% steam and is labeled herein as EX 4 STM. $N_2$ adsorption-desorption isotherms and pore size distribution (PSD) are shown in FIGS. 4A and 4B, respectively. The molar ratio of Al:P:RE was 6.14:1:0.56 for these materials, e.g., in the as-synthesized form (EX 4 AS), the calcined and exchanged form (EX 4 CAL) and the steamed form (EX 4 STM). Properties of these materials are shown in Table 1.

EXAMPLE 5

Preparation of Mesoporous Alumina Modified with Praseodymium and Phosphorous

In a plastic beaker, 27 g of 85% $H_3PO_4$ was slowly added to 300 g of DI water with stirring. 102 g of $Pr(NO_3)_3 \cdot 6H_2O$ and 45 g of concentrated (96%) $H_2SO_4$ were then added with stirring (mixture A). In a separate plastic beaker, 153.6 g of $NaAlO_2$ (EMD chemicals) and 180 g of MTAB were dissolved in 960 g of DI water (mixture B). Mixture A was then slowly added to mixture B with vigorous stirring. The pH of the combined mixture is 11.4. An amount of 16.5 g of concentrated (96%) $H_2SO_4$ was then added to bring the pH to 9.0. The combined mixture was then placed in a steam box (98° C.) and held for 48 hr. The solid was filtered, washed with DI water, and dried in an oven at 110° C. overnight. This as-synthesized, solid material is labeled herein as EX 5 AS.

Figure 5A:
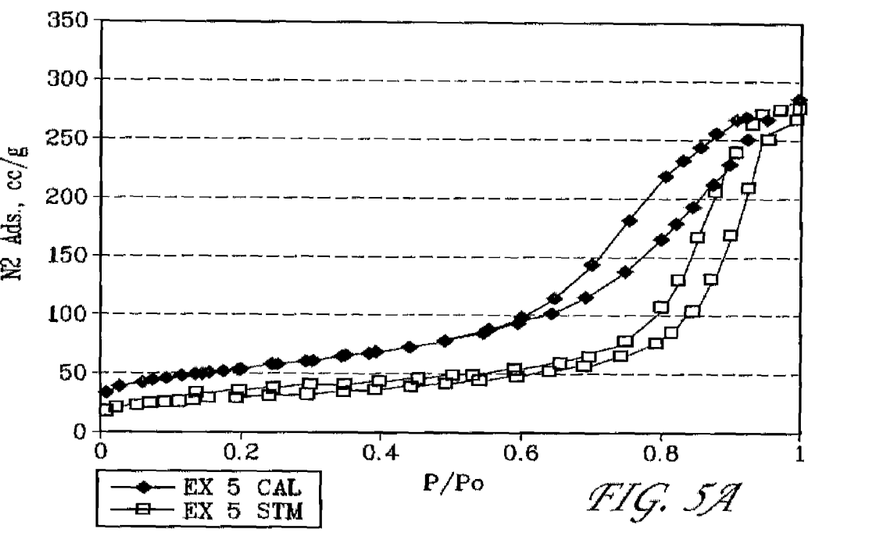
FIG. 5A is a graph plotting $N_2$ adsorption isotherms for Pr/P stabilized alumina as described in Example 5.
Figure 5B:
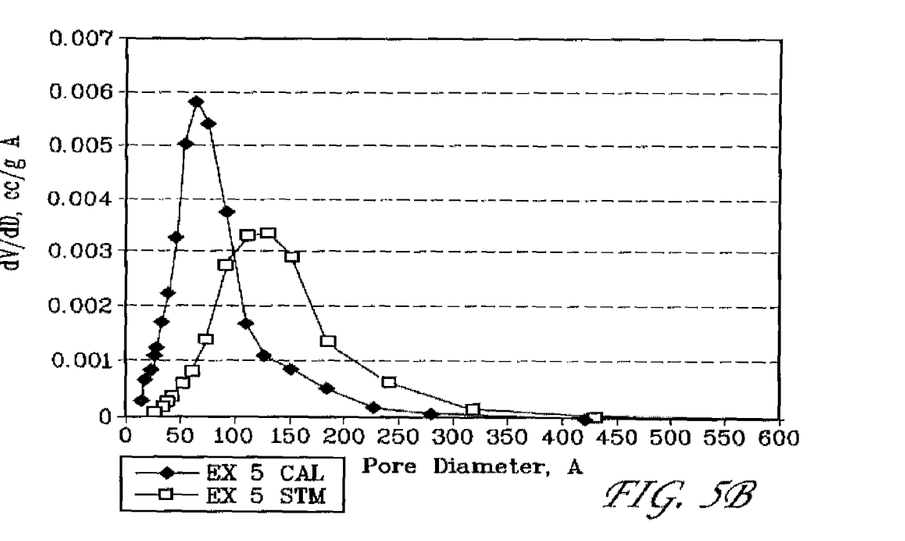
FIG. 5B is a graph plotting pore size distribution (PSD) measured by $N_2$ physi-sorption for Pr/P stabilized alumina as described in Example 5.

The surfactant was removed by calcination in air at 500° C. for 4 hr; and the $Na^+$ in the calcined material was removed by exchanging with 1 N $NH_4NO_3$ solution. The material was calcined again at 500° C. for 3 hr after the exchange and is labeled herein as EX 5 CAL. The exchanged and calcined material was then steamed at 760° C. for 16 hr in 100% steam and is labeled herein as EX 5 STM. $N_2$ adsorption-desorption isotherms and pore size distribution (PSD) are shown in FIGS. 5A and 5B, respectively. The molar ratio of Al:P:RE was 6.42:1:0.80 for these materials, e.g., in the as-synthesized form (EX 5 AS), the calcined and exchanged form (EX 5 CAL) and the steamed form (EX 5 STM). Properties of these materials are shown in Table 1.

Figure 6:
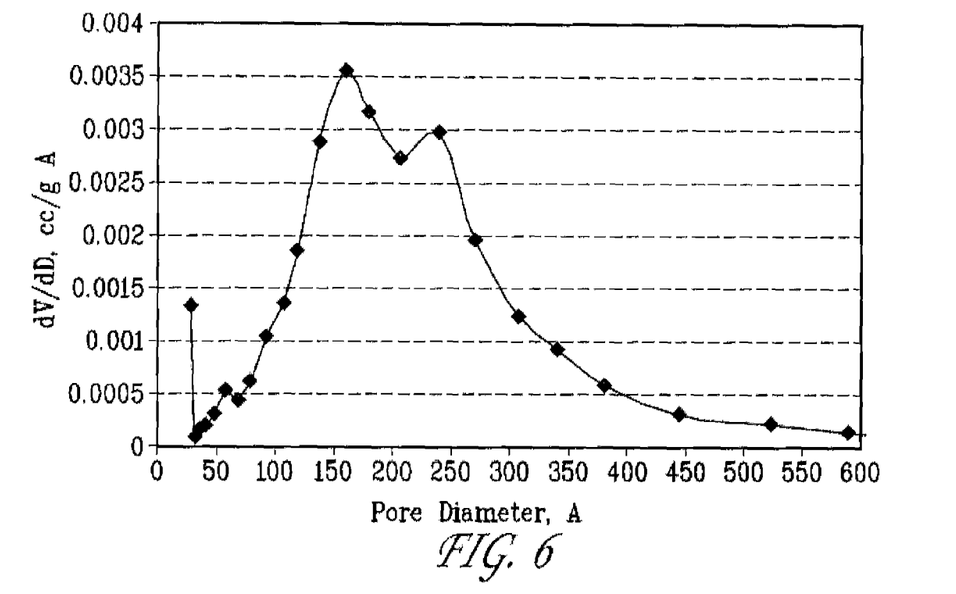
FIG. 6 is a graph plotting pore size distribution (PSD) measured by $N_2$ physi-sorption for a steamed Versal 700® boehmite alumina as described in Example 5.

For the purposes of comparison, properties of a boehmite alumina (i.e. Versal 700®) are also shown in Table 1. It is noted that when the boehmite alumina is steamed under the same conditions as the materials in Examples 1-5, only 32% of the surface area is retained. The pore size distribution (PSD) for the steamed boehmite alumina is shown in FIG. 6.

TABLE 1

Summary of physical properties of the RE and P modified mesoporous aluminas

| Sample | SA ($m^2$/g) | PV (cc/g) | Pore size (Å) | Pore size distribution | | | TPAA (mmol/g) | SA retention after steaming(%) |
| --- | --- | --- | --- | --- | --- | --- | --- | --- |
| | | | | <45 (Å) | 45-200 (Å) | >200 (Å) | | |
| EX 1 AS | 212 | | | | | | | |
| EX 1 CAL | 247 | 0.49 | 55 | 17% | 74% | 9% | 0.21 | |
| EX 1 STM | 98 | 0.44 | 150 | 0.2% | 72% | 37% | | 40% |
| EX 2 AS | 211 | | | | | | | |

TABLE 1-continued

Summary of physical properties of the RE and P modified mesoporous aluminas

| Sample | SA (m²/g) | PV (cc/g) | Pore size (Å) | Pore size distribution <45 (Å) | 45-200 (Å) | >200 (Å) | TPAA (mmol/g) | SA retention after steaming(%) |
|---|---|---|---|---|---|---|---|---|
| EX 2 CAL | 253 | 0.5 | 60 | 18% | 72% | 10% | 0.17 | |
| EX 2 STM | 127 | 0.49 | 110 | 1.3% | 69% | 30% | | 50% |
| EX 3 AS | 102 | | | | | | | |
| EX 3 CAL | 178 | 0.45 | 80 | 7% | 79% | 14% | 0.20 | |
| EX 3 STM | 105 | 0.48 | 170 | 0.6% | 61% | 39% | | 59% |
| EX 4 AS | 196 | | | | | | | |
| EX 4 CAL | 230 | 0.52 | 70 | 11% | 80% | 9% | 0.29 | |
| EX 4 STM | 112 | 0.50 | 200 | 0.3% | 63% | 37% | | 49% |
| EX 5 AS | 106 | | | | | | | |
| EX 5 CAL | 189 | 0.45 | 70 | 8% | 80% | 12% | 0.20 | |
| EX 5 STM | 102 | 0.43 | 150 | 0.4% | 69% | 31% | | 54% |
| Versal 700 | 310 | | | | | | | |
| Versal 700 steamed | 99 | 0.74 | Bi-modal | 1% | 38% | 61% | | 32% | where SA = surface area as measured by nitrogen adsorption, (m²/g) PV = pore volume as measured by nitrogen adsorption, (cc/g) TPAA = Temperature programmed ammonia adsorption, as disclosed herein.

EXAMPLE 6

Preparation of Fluid Catalytic Cracking (FCC) Catalysts Using the Rare Earth and Phosphorous Stabilized Mesoporous Alumina (Invention)

The mesoporous alumina disclosed here is used as matrix for FCC catalysts. A commercially available rare-earth exchanged Y zeolite (REY) is used as the zeolite component. Aluminum chlorohydrate (ACH) is used as binder, and clay (Hydrite UF) as an inert filler. The catalyst is formulated by combining REY (25%), mesoporous alumina (20%), ACH (10%), and clay to make a slurry, which is spray dried to give spherical catalyst particles. The spray-dried catalyst is then ion-exchanged with ammonium sulfate, dried and calcined at 600° C. for 1 h to get the exchanged catalyst. The exchanged catalyst is then steam deactivated at 760° C. with 100% steam for 16 h before used for FCC.

EXAMPLE 7

Preparation of Fluid Catalytic Cracking (FCC) Catalysts Using Conventional Alumina (Boehmite)—Versal 700® (Comparative)

The catalyst is made in the same way as in Example 6 with the exception that the matrix material is Versal 700® from a commercial source.

EXAMPLE 8

FCC of Vacuum Gas Oil (VGO)

FCC of VGO was tested using a simulated fluidized bed reactor by feeding 1 g of the catalyst at temperature around 560° C. The VGO feed was vaporized and passed over the fluidized catalyst with a contact time in the order of a second. The feed injection rate was varied in order to screen the catalyst under different catalyst-to-oil ratios. After proper stripping, products are sent to the analytical system via a gas-liquid separation device. Using nitrogen, heavy products are stripped from the spent catalyst and sent to the gas-liquid separator. Coke is removed during an air burn out of the spent catalyst and the amount of coke is calculated using Infrared spectroscopy data measuring the amount of $CO_2$ and CO generated.

Figure 7A:
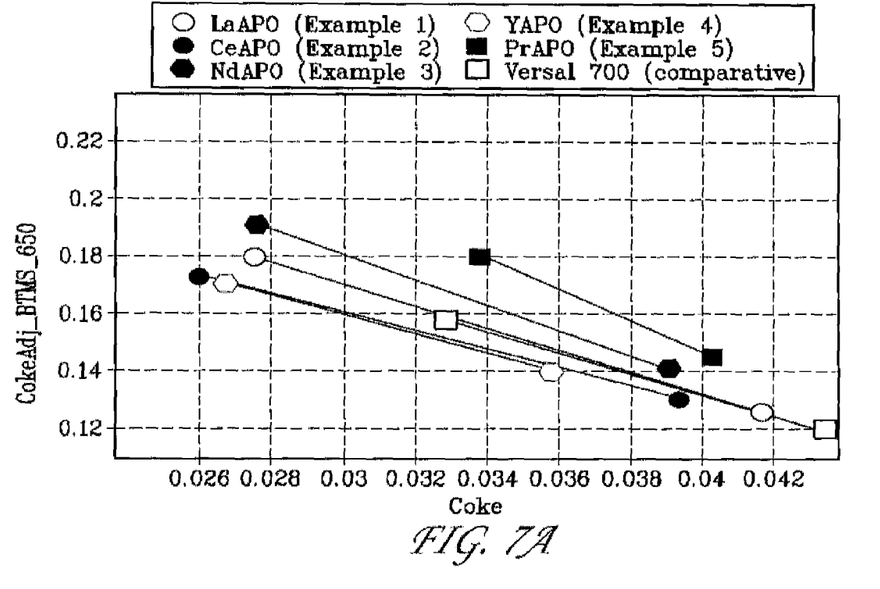
FIG. 7A is a graph plotting bottom yield vs. coke generated in a fluid catalytic cracking (FCC) process as described in Examples 6-8.
Figure 7B:
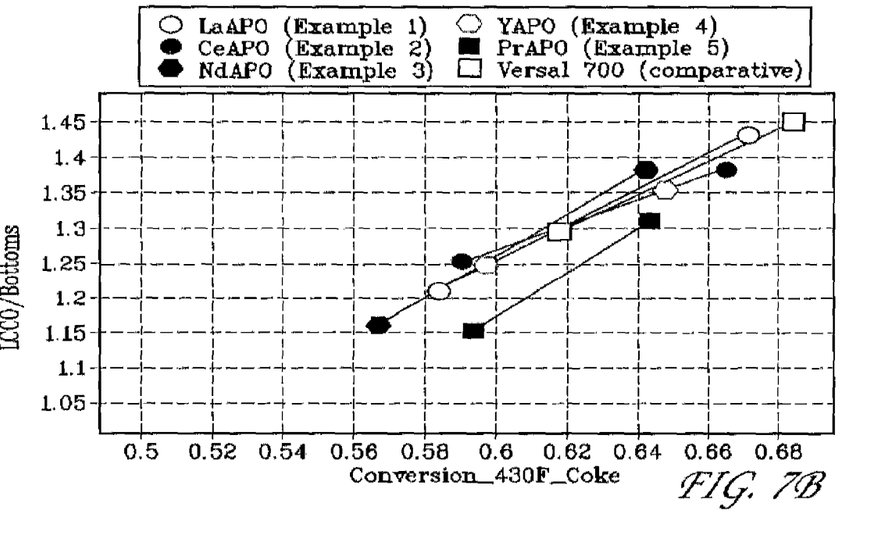
FIG. 7B is a graph plotting light cycle oil (LCCO) yield vs. conversion in a fluid catalytic cracking (FCC) process as described in Examples 6-8.
Figure 7C:
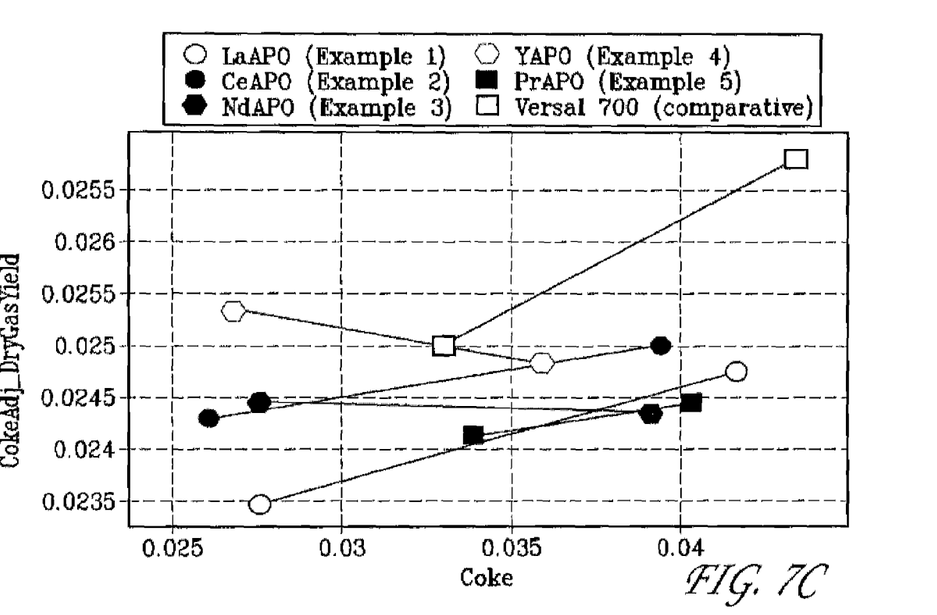
FIG. 7C is a graph plotting dry gas yield vs. coke generated in a fluid catalytic cracking (FCC) process as described in Examples 6-8.

The FCC performance data are shown in FIGS. 7A-7C. Compared with conventional alumina matrix, the novel mesoporous and stabilized alumina show several advantages. First, improved bottom conversion was observed. For example, the materials from Examples 2 (Ce/P alumina) and 4 (Y/P alumina) show lower bottoms (higher conversion) than Versal 700® at a constant coke level of ca 3.5%. Second, increased light cycle oil (LCCO) yield was observed. For example, the materials from Examples 1 (La/P alumina) and 3 (Nd/P alumina) show higher LCCO yield than Versal 700® at a constant conversion of 64%. Third, reduced dry gas make was observed. For example, all materials from this invention show lower dry gas (hydrogen, methane, and ethane) than Versal 700® at a constant coke level of 3.5%.

What is claimed is:

1. A method for making a mesoporous alumina composition comprising, in addition to aluminum (Al), at least one rare earth element (RE) and phosphorus (P), said method comprising the steps of:
   (a) forming a reaction mixture comprising a source of at least one rare earth element, a source of aluminum, a source of phosphorus, and a mesopore templating agent in a liquid medium;
   (b) maintaining said reaction mixture of step (a) under conditions sufficient to precipitate said sources of rare earth element, aluminum, phosphorus and said mesopore templating agent to form an as-synthesized form of said mesoporous alumina composition comprising residual mesopore templating agent within pores of said mesoporous oxide composition;
   (c) separating said liquid from the as-synthesized form of said mesoporous alumina composition obtained in step (b);
   (d) optionally, removing at least a portion said mesopore templating agent from said as-synthesized form of said mesoporous alumina composition of step (c) by solvent extraction; and
   (e) calcining said as-synthesized form of said mesoporous alumina composition of step (c) or step (d) under calcination conditions to form a calcined form of said mesoporous alumina composition, wherein said calcination conditions are sufficient to remove any residual mesopore templating agent and to cause condensation reactions with hydroxyl groups to liberate $H_2O$;

wherein a molar ratio of Al:P:RE in said reaction mixture of step (a) is 5-10:1:0.5-1, and wherein said calcined form of said mesoporous alumina composition of step (e) has an average pore size of from 45 Angstroms to 80 Angstroms, and a surface area of 150 to 300 $m^2/g$.

2. A method according to claim 1, wherein said source of aluminum is selected from the group consisting of a basic aluminum salt, an acidic aluminum salt, an alumina gel or sol and an aluminum alkoxide.

3. A method according to claim 1, wherein said source of phosphorus is selected from the group consisting of phosphoric acid and ammonium phosphate.

4. A method according to claim 1, wherein said source of rare earth element is a nitrate or sulfate salt of at least one rare earth element selected from the group consisting of La, Ce, Nd, Y and Pr.

5. A method according to claim 1, wherein said mesopore templating agent comprises at least one cationic surfactant, anionic surfactant or non-ionic surfactant or a combination thereof.

6. A method according to claim 5, wherein said mesopore templating agent further comprises at least one hydrocarbon having at least 5 carbon atoms.

7. A method according to claim 1, wherein said mesopore templating agent comprises at least one agent selected from the group consisting of tetraethylene glycol, triethanolamine, triisopropylamine, triethylene glycol, diethylene glycol, sulfolane and diethylglycoldibenzonate.

8. A method according to claim 1, wherein said mesopore templating agent is a cationic surfactant of the formula:

wherein Q is nitrogen or phosphorus and wherein at least one of $R_1$, $R_2$, $R_3$ and $R_4$ is aryl or alkyl of from 6 to about 36 carbon atoms, the remainder of $R_1$, $R_2$, $R_3$ and $R_4$ being selected from the group consisting of hydrogen, alkyl of from 1 to 5 carbon atoms and combinations thereof.

9. A method for making a mesoporous alumina composition comprising, in addition to aluminum (Al), at least one rare earth element (RE), phosphorus (P), and M, where M is at least one element other than oxygen (O), Al, P, and RE capable of being incorporated into said mesoporous alumina composition, said method comprising the steps of:
(a) forming a reaction mixture comprising a source of at least one rare earth element, a source of aluminum, a source of phosphorus, a source of M, and a mesopore templating agent in a liquid medium;
(b) maintaining said reaction mixture of step (a) under conditions sufficient to precipitate said sources of rare earth element, aluminum, phosphorus, M, and said mesopore templating agent to form an as-synthesized form of said mesoporous alumina composition comprising residual mesopore templating agent within pores of said mesoporous alumina composition;
(c) separating said liquid from the as-synthesized form of said mesoporous alumina composition obtained in step (b);
(d) optionally, removing at least a portion said mesopore templating agent from said as-synthesized form of said mesoporous alumina composition of step (c) by solvent extraction; and
(e) calcining said as-synthesized form of said mesoporous alumina composition of step (c) or step (d) under calcination conditions to form a calcined form of said mesoporous alumina composition, wherein said calcination conditions are sufficient to remove any residual mesopore templating agent and to cause condensation reactions with hydroxyl groups to liberate $H_2O$;

wherein a molar ratio of Al:P:RE:M in said reaction mixture of step (a) is 5-10:1:0.5-1:up to 0.3, and wherein said calcined form of said mesoporous alumina composition of step (e) has an average pore size of from 45 Angstroms to 200 Angstroms and a mono-modal pore size distribution.

10. A method according to claim 9, wherein M is selected from the group consisting of Si, Ga, B, S, Ti, Fe, Ni, Mo, Co, Cr, Mg, Zn, Sn, V, W, Ru, Pt, Pd, In, Mn, Cu, Ba, Ca and Zr.

11. A method according to claim 9, wherein the calcined form of the mesoporous alumina composition has an average pore size of from 45 Angstroms to 80 Angstroms, and a surface area of 150 to 300 $m^2/g$.

12. A method according to claim 9, wherein the mesoporous alumina composition retains at least 40% of its surface area after being steamed at 760° C. for 16 hours in 100% steam.

13. A method according to claim 12, wherein the calcined form of the mesoporous alumina composition is steamed under conditions sufficient to form a steamed form of the mesoporous alumina composition having an average pore size of at least 100 Angstroms and a surface area of at least 90 $m^2/g$.

* * * * *